United States Patent [19]
Keener et al.

[11] Patent Number: 5,586,302
[45] Date of Patent: Dec. 17, 1996

[54] PERSONAL COMPUTER SYSTEM HAVING STORAGE CONTROLLER WITH MEMORY WRITE CONTROL

[75] Inventors: Don S. Keener; Gregory J. Moore, both of Boca Raton, Fla.

[73] Assignee: International Business Machines Corporation, Armonk, N.Y.

[21] Appl. No.: 711,245

[22] Filed: Jun. 6, 1991

[51] Int. Cl.$^6$ .................................................... G06F 13/00
[52] U.S. Cl. ................................ 395/481; 364/DIG. 1; 395/438
[58] Field of Search ........................... 364/200 MS File, 364/900 MS File; 395/400 MS, 425 MS

[56] References Cited

U.S. PATENT DOCUMENTS

| | | | |
|---|---|---|---|
| 4,454,575 | 6/1984 | Bushaw et al. | 395/425 |
| 4,476,522 | 10/1984 | Bushaw et al. | 395/425 |
| 4,709,329 | 11/1987 | Hecker | 395/275 |
| 4,821,170 | 4/1989 | Bernick et al. | 395/275 |
| 5,070,474 | 12/1991 | Tuma et al. | 395/500 |
| 5,175,826 | 12/1992 | Begun et al. | 395/325 |

OTHER PUBLICATIONS

"Standard SCSI Bus Facilitates Peripheral Control" by Beims et al., EDN, Apr. 1985, pp. 241–252.
"Multitasking Keys SCSI Control of Large SMD–Compatible Disks" by Bowman, Electronic Design, Jun. 1987, pp. 89–93.

*Primary Examiner*—Reba L. Elmore
*Attorney, Agent, or Firm*—Daniel E. McConnell

[57] ABSTRACT

This invention relates to personal computers, and more particularly to a personal computer using a small computer systems interface (SCSI) controller coupled directly to the local processor bus for controlling data transfer with storage memory devices such as fixed or removable media electromagnetic storage devices. The storage controller in accordance with this invention has internal volatile memory for transitory storage of data being communicated to coupled volatile memory. It further has control drivers interposed between the internal volatile memory and external volatile memory for controlling communication of data to the external volatile memory, with an enable driver and an enable receiver enchained between the control drivers and a source of signals controlling data communication. The enchained driver and receiver are connected for issuing a write signal to the external volatile memory prior to enablement of data communication through the control drivers and for sustaining a control signal communicated to the control drivers for enabling data communication until after deactivation of the write signal.

5 Claims, 4 Drawing Sheets

PERSONAL COMPUTER SYSTEM HAVING STORAGE CONTROLLER WITH MEMORY WRITE CONTROL

TECHNICAL FIELD

This invention relates to personal computers, and more particularly to a personal computer using a small computer systems interface (SCSI) controller coupled directly to the local processor bus for controlling data transfer with storage memory devices such as fixed or removable media electromagnetic storage devices.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

As the development of personal computers has advanced, there have been proposals for certain standards to be established among makers and users of such apparatus for the purpose of enabling greater exchangability of components and the like. One such standard which have achieved some broad acceptance is the small computer systems interface (SCSI) standard for data communication to and from storage memory devices. For the present purposes, "storage memory devices" is defined broadly to include all devices capable of storing data in digital form, with particular emphasis on such devices as fixed or removable media electromagnetic storage devices (also known as hard and floppy disk drives), electro-optical, tape and other storage devices. SCSI controllers have been known and used prior to this invention, and will be familiar to the knowledgeable reader.

In prior personal computer systems, SCSI controllers have typically been arranged as option or accessory devices, accessed by the system through the accessory or input/output or I/O bus. In such arrangements, data transfer rates or operating speeds are relatively lower. As a consequence, the provision of data hold times for transfer through gate devices or drivers was relatively easily accomplished. Two approaches used to assure appropriate data transfer have been the provision of additional wait cycles or clocked intervals to the logic involved, so that extra time was allowed, and reliance on internal gate delays introduced in part to assure timing.

It is now contemplated to provide a SCSI controller as a single very large scale integrated (VLSI) device or application specific integrated circuit (ASIC) chip, and to provide for connection of that controller directly with the local processor bus. The purpose of so providing such a controller is to achieve enhanced performance in terms of expedited data transfers. However, the two approaches identified above either impair or endanger such performance. In particular, the introduction of additional states and clock cycles into the arrangement is functional while imposing an unacceptable performance penalty. Where high performance is sought, reliance on gate delays is unacceptably risky as such delays are subject to significant variation from device to device or over time and in varying operating conditions.

BRIEF DESCRIPTION OF THE INVENTION

With the foregoing in mind, it is an object of this invention to provide a VLSI or ASIC SCSI controller coupled directly to a local processor bus and capable of high performance in terms of data transfer. In realizing this object of the present invention, provision is made for assuring that sufficient time intervals are employed for data transfer while avoiding excessive delays or risk of data loss in such transfers.

A further object of this invention is to provide, in a VLSI SCSI controller, logic internal to the device which assures that effective and minimal time data transfers occur. In realizing this object of the present invention, an enchained pair of a driver and a receiver are used to pass a memory write signal to data transfer drivers. The appropriate assurance of data transfer and avoidance of excessive delay or risk is achieved by the characteristics of the driver and receiver.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
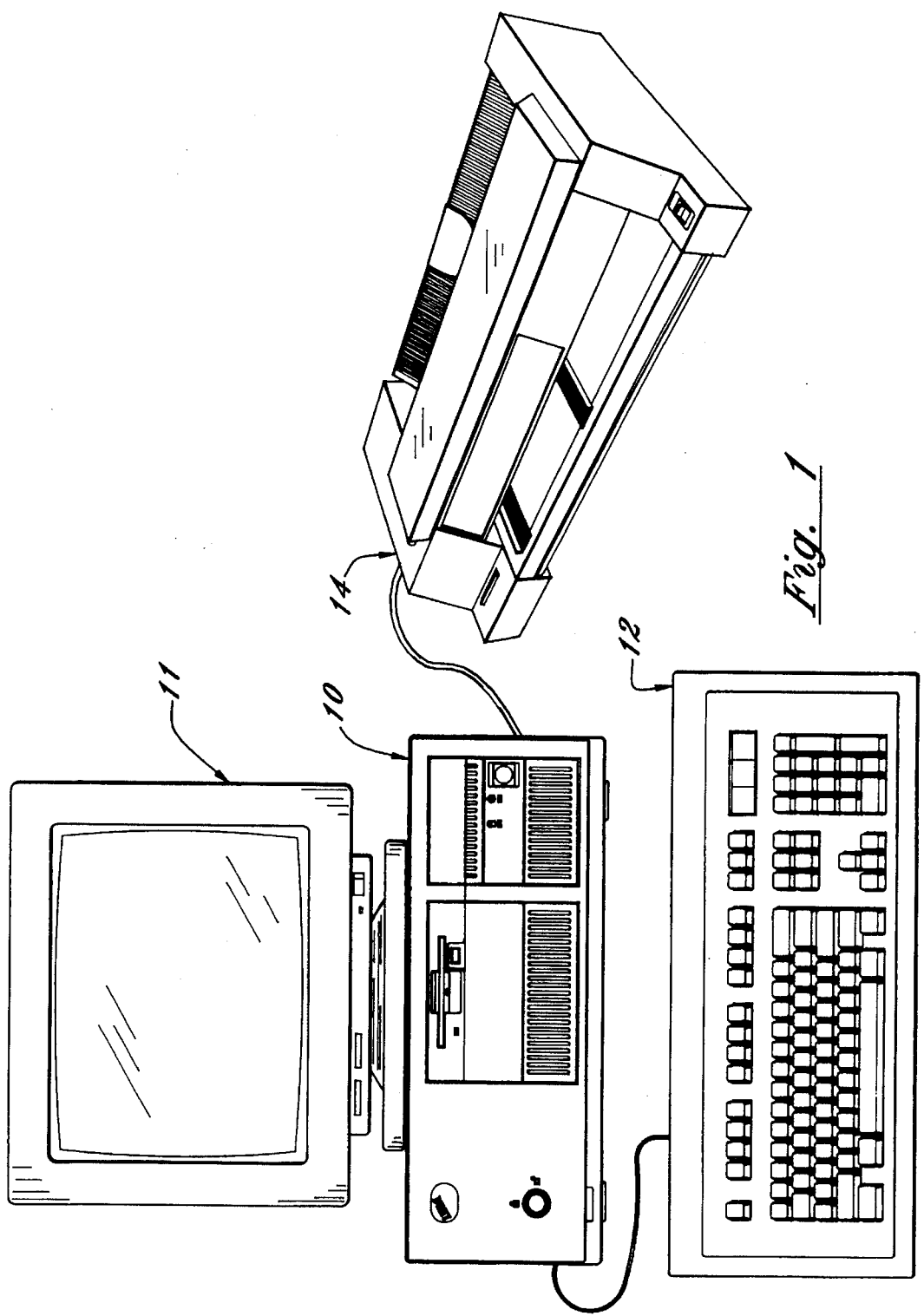
FIG. 1 is a perspective view of a personal computer embodying this invention.
Figure 2:
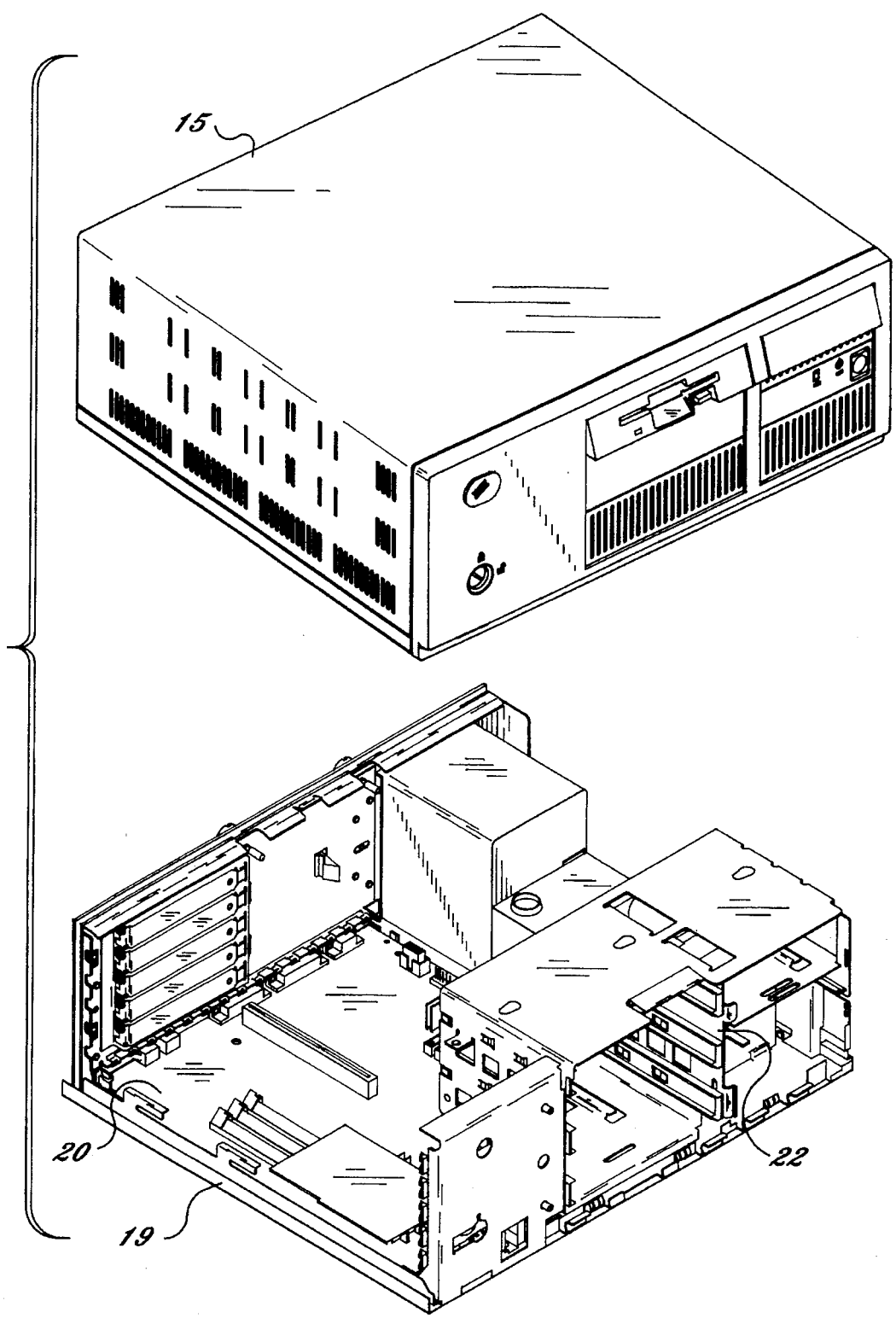
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
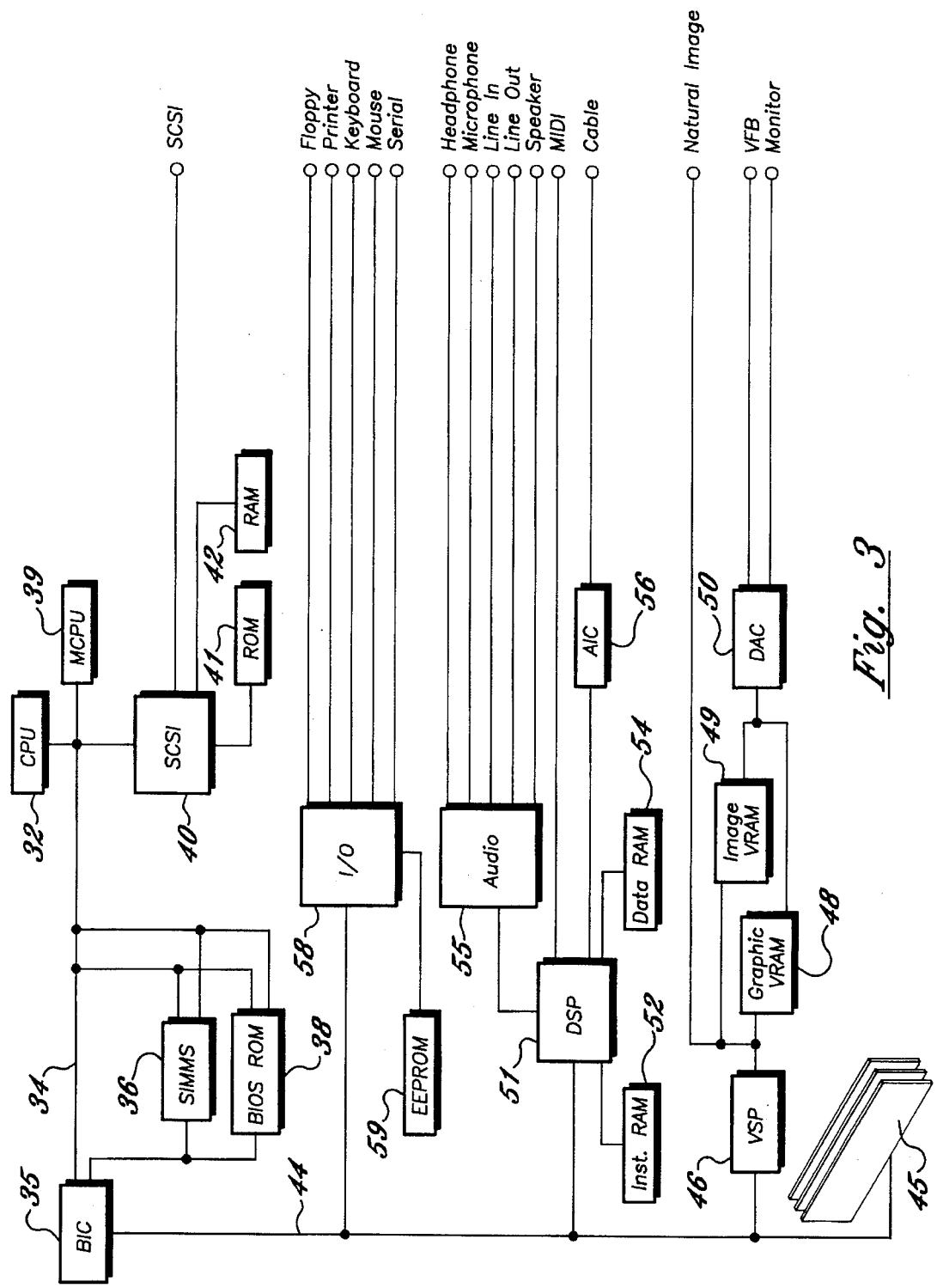
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

Figure 4:
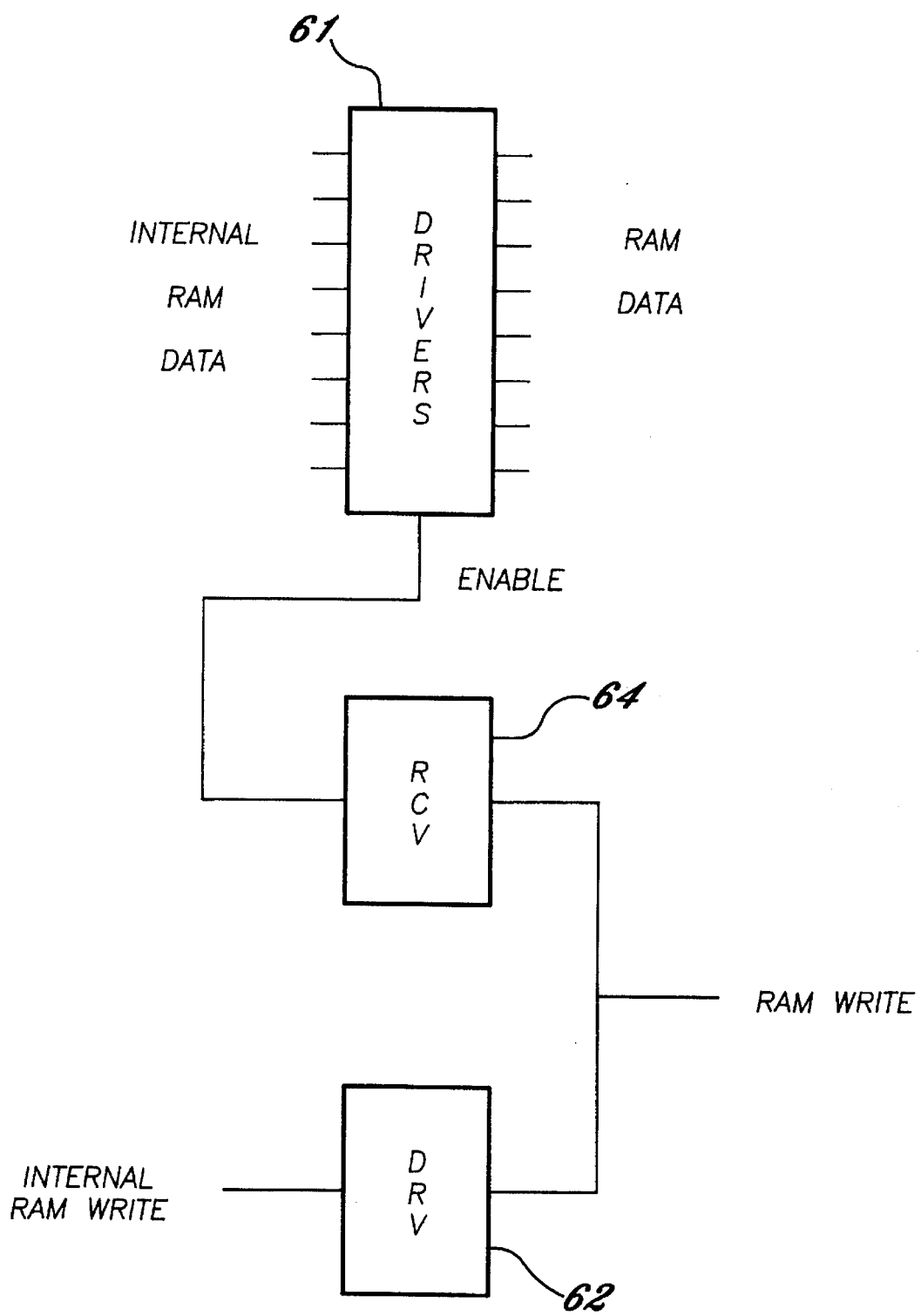
FIG. 4 is a schematic view of certain components included in the SCSI controller of the personal computer of FIGS. 1 through 3.

Turning now more directly to the characteristics of the present invention, the SCSI controller 40 has within it certain circuit elements illustrated in FIG. 4. More particularly, the controller 40 has control drivers indicated at 61 interposed between internal volatile memory or RAM cells provided in the VLSI structure of the device and the external volatile memory RAM 42 coupled to the controller 40 for controlling communication of data to the RAM 42. The storage controller 40 further has an enable driver 62 and an enable receiver 64 enchained between the control drivers 61 and a source of signals controlling data communication. The driver 62 and receiver 64 are formed as an output/input cell of the VLSI and replace, functional, what might otherwise have been an output cell connected with an output pin of the package for the VLSI and thereby with the external RAM 42. The enchained driver 62 and receiver 64 are connected for issuing a write signal to the external RAM 42 prior to enablement of data communication through the control drivers 61 and for sustaining a control signal communicated to the control drivers 61 for enabling data communication until after deactivation of the write signal. The signal directed to the external RAM issues from a circuit point between the driver 62 and receiver 64. The signal directed to the driver 62 and receiver 64 arrives from within the VLSI structure of the SCSI controller 40, and is passed from the receiver 64 to the enable port of the drivers 61 which are interposed between the source of data to be transferred from the controller 40 to the associated external RAM 42. The drivers 61 receive data from within the VLSI structure of the SCSI controller 40 and pass that data onward (under control as here described) to the external RAM 42.

By the structure described above and the cooperation contemplated, the internal logic of the SCSI controller 40 has knowledge of when the external pin on the device has reached an inactive state and it is safe to degate the write data passing through the drivers 61. The drivers 61 (which gate write data to the RAM 42) are not enabled until the write pulse has become active at the RAM, and are not degated until the write pulse has become inactive at the RAM. The RAM requires a minimum of a certain number of nanoseconds of data hold time at the drivers 61. The present circuit guarantees this minimum, with a guard band of the delay time in the receiver and the degate time in the drivers.

Stated differently, the enchained driver and receiver are connected for delaying the enablement of data communication through the control drivers after issuance of a write signal to the external volatile memory by an interval determined by the delay imposed by the enable receiver and for sustaining the enablement of data communication through the control drivers for an interval determined by the degate delay imposed by the control drivers.

The circuit of the present invention has another advantage, important in some packaging. That is that it saves pins as compared with any alternative circuit which would use "output enable" signals exchanged with the RAM.

In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:

a high speed local processor data bus;

a microprocessor coupled directly to said high speed local processor data bus;

a storage controller coupled directly to said high speed local processor data bus for regulating communications between said microprocessor and storage memory devices; and external volatile memory coupled to said storage controller for volatile storage of data;

said storage controller having internal volatile memory for transitory storage of data being communicated to said external volatile memory; said storage controller further having control drivers interposed between said internal volatile memory and said external volatile memory for controlling communication of data to said external volatile memory; said storage controller further having an enable driver and an enable receiver enchained between said control drivers and a source of signals controlling data communication, said enchained enable driver and enable receiver being connected for issuing a write signal to said external volatile memory prior to enablement of data communication through said control drivers and for sustaining a control signal communicated to said control drivers for enabling data communication until after deactivation of the write signal.

2. A personal computer system according to claim 1 further comprising said enchained enable driver and enable receiver cooperating for delaying an enablement of data communication through said control drivers by an interval determined by a delay imposed by said enable receiver.

3. A personal computer system according to claim 2 wherein said enchained enable driver and enable receiver sustain an enablement of data communication through said control drivers by an interval determined by a degate delay imposed by said control drivers.

4. A personal computer system according to claim 1 wherein said enchained enable driver and enable receiver sustain an enablement of data communication through said control drivers by an interval determined by a degate delay imposed by said control drivers.

5. A personal computer system comprising:

a high speed local processor data bus;

a microprocessor coupled directly to said high speed local processor data bus;

a storage controller coupled directly to said high speed local processor data bus for regulating communications between said microprocessor and storage memory devices; and external volatile memory coupled to said storage controller for volatile storage of data;

said storage controller having internal volatile memory for transitory storage of data being communicated to said external volatile memory; said storage controller further having control drivers interposed between said internal volatile memory and said external volatile memory for controlling communication of data to said external volatile memory; said storage controller further having an enable driver and an enable receiver enchained between said control drivers and a source of signals controlling data communication, said enchained enable driver and enable receiver being connected for delaying an enablement of data communication through said control drivers after issuance of a write signal to said external volatile memory by an interval determined by a delay imposed by said enable receiver and for sustaining the enablement of data communication through said control drivers for an interval determined by a degate delay imposed by said control drivers.

* * * * *